United States Patent [19]

Sampsell

[11] Patent Number: 5,233,385
[45] Date of Patent: Aug. 3, 1993

[54] WHITE LIGHT ENHANCED COLOR FIELD SEQUENTIAL PROJECTION

[75] Inventor: Jeffrey B. Sampsell, Plano, Tex.

[73] Assignee: Texas Instruments Incorporated, Dallas, Tex.

[21] Appl. No.: 809,816

[22] Filed: Dec. 18, 1991

[51] Int. Cl.⁵ .............................................. G03B 27/72
[52] U.S. Cl. .......................................... 355/35; 355/77
[58] Field of Search ................... 355/32, 35, 38, 68, 355/77, 326, 71; 353/84; 356/444; 358/215, 216, 233, 335, 345; 359/889, 891, 315–320, 322–325, 887

[56] References Cited

U.S. PATENT DOCUMENTS

| | | | |
|---|---|---|---|
| 4,757,351 | 7/1988 | Birgmeir | 355/38 |
| 4,825,256 | 4/1989 | Nakai et al. | 355/32 X |
| 4,843,431 | 6/1989 | Horiguchi et al. | 355/35 X |

Primary Examiner—Michael L. Gellner
Assistant Examiner—D. Rutledge
Attorney, Agent, or Firm—Julie L. Reed; James C. Kesterson; Richard L. Donaldson

[57] ABSTRACT

A method for increasing the brightness of a scene in a color projection system is disclosed. The brightness can be increased in both temporal and spatial filtering systems. In a temporal system, a portion of the total illumination time is allocated to white light to raise the overall brightness. In a spatial system, part of the illuminated area is allocated to white light. The parts could be allocated as regions on a spatial light modulator, or a spatial light modulator could be dedicated to that area to use white light.

9 Claims, 1 Drawing Sheet

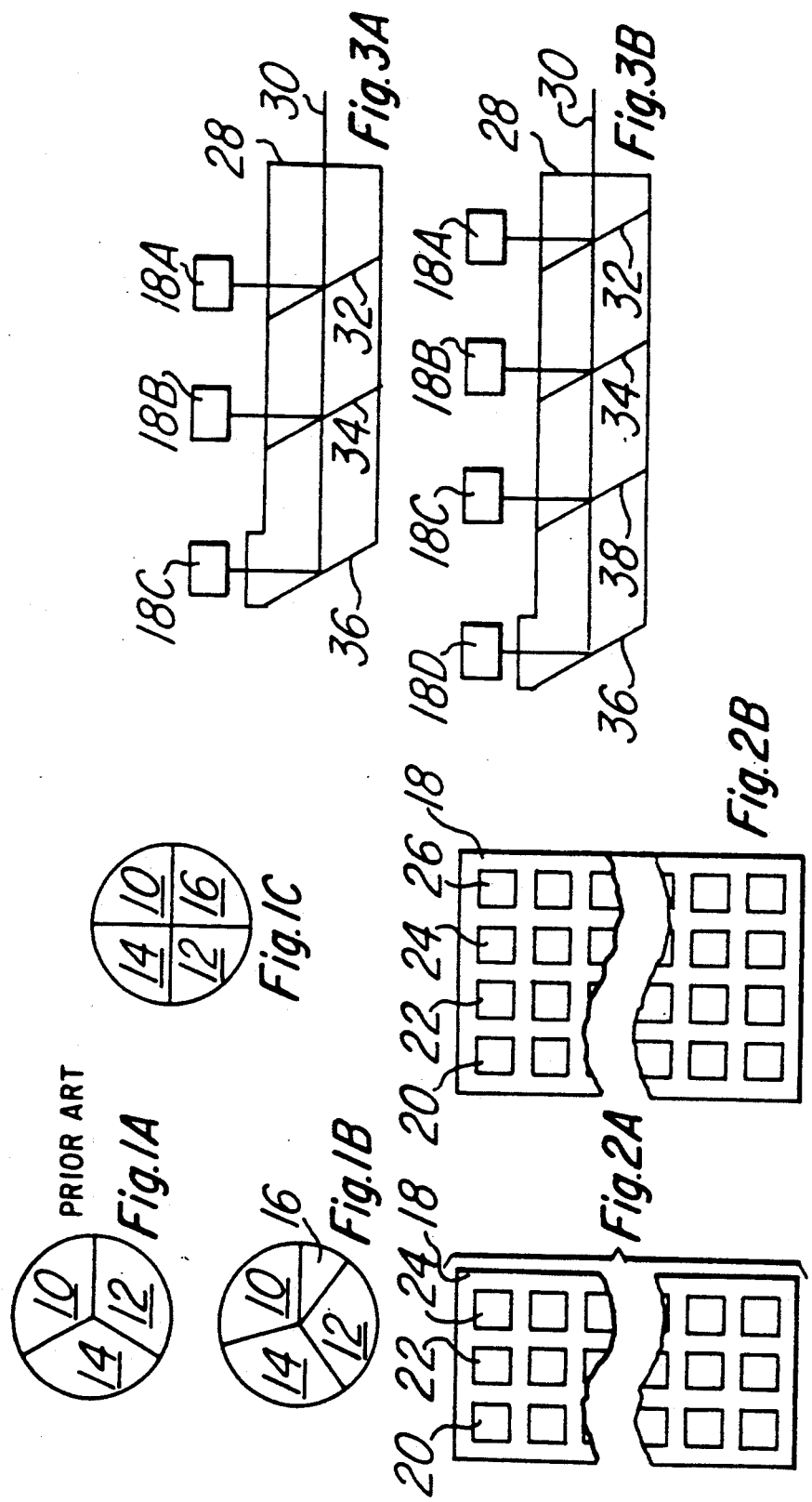

WHITE LIGHT ENHANCED COLOR FIELD SEQUENTIAL PROJECTION

BACKGROUND OF THE INVENTION

1. Field of the Invention

This invention relates to color projection systems, more particularly to color projection systems that use a white light source.

2. Background of the Invention

The use of white light sources in color projection systems offer many advantages. They are relatively inexpensive, use low amounts of power, and are easier to install and replace. Other options, such as lasers, or Light-Emitting Diodes (LEDs), are expensive, use large amounts of power and require three sources, one for red, green, and blue, respectively.

White light also offers the full color spectrum, which can be filtered to select a desired color, such as red, green and blue. This becomes important when the light is to be directed to the projection surface, as is done when spatial light modulators are used. Normally, the spatial light modulator is positioned between the source or sources, and the projection surface, be it a television, a printer drum, a piece of photographic film, or any photosensitive media. The light from the source impinges upon the modulator that, in turn, selectively directs the light to the projection surface. In this type of system, the color of the light is normally done with filters.

The color filtering can be done either spatially or temporally. In order to spatially color filter, three sets of arrays, or three sections, such as rows on one array, could be filtered for one of the three required colors. The key in this instance is to separate the colors and direct one color onto its own dedicated space, such as a separate modulator device, or an area upon one device.

The other option is to temporally filter the light. One way is to use a rotating filter that is divided into equal fields of the three colors. This is normally called a color wheel. The standard wheel is divided into three arcs of the circle, each being 120°. The wheel then spins in front of the source, relying the appropriate amount of each color to the projection surface. The amount of each color is dependent on how long the cells of the modulator pass the colored light to the surface.

An inherent trade-off exists in any color projection system. If the desire is for color saturation, there will be a drop-off in overall brightness. Likewise, if overall brightness is desired, some loss in color saturation will possibly result. In many cases, viewers have been found to favor brightness over color saturation. A problem exists in standard color projection techniques, which tend to favor color saturation over brightness. Therefore, a way is needed to adapt the current methods of color projection to provide better brightness, without having too great an effect upon color saturation.

The initial solution to this problem would be to simply use a brighter light. Depending on the system limitations and requirements, it may not be possible to use a bright enough source to alleviate this problem. Therefore, some alternate solution must be found.

SUMMARY OF THE INVENTION

The present invention disclosed herein comprises enhancing color projection systems with the use of white light. A portion of the original white light beam is preserved to raise the overall brightness of the scene. The filtered beams of red, green and blue are used to color the scene to the appropriate extent. The original white light beam can be filtered either spatially or temporally, with either a portion of time or illuminated surface area being reserved for white light.

BRIEF DESCRIPTION OF THE DRAWINGS

For a more complete understanding of the present invention and for further advantages thereof, reference is now made to the following Detailed Description taken in conjunction with the accompanying Drawings in which:

FIGS. 1A–1C show a standard color wheel, and adaptations to utilize white light.

FIGS. 2A and 2B show one embodiment of a spatial filtering method, and an adaptation to utilize white light.

FIGS. 3A and 3B show an alternative embodiment for spatially filtering color, and an adaptation to utilize white light.

DETAILED DESCRIPTION OF THE PREFERRED EMBODIMENTS

Temporal color filtering is normally done by allocating a certain time segment to each of the three primary additive colors, where the segments are equal. There are many techniques for temporal filtering, one of which is a color wheel. For discussion, purposes, the concepts of temporal filtering using white light will be discussed in the context of the color wheel.

A three-color wheel is shown in FIG. 1A. The wheel is divided evenly into three colors, red 10, green 12, and blue 14. The color wheel rotates once a video frame or field, depending upon the scanning mode in use. When the normal frame rate is 60 frames/sec, the color wheel rotates 60 times a second, or 3600 revolutions per minute.

Each color is $33\frac{1}{3}\%$ the intensity of white light, since it is a $\frac{1}{3}$ component of white light. Additionally, each color is allocated $\frac{1}{3}$ the total frame time. This can be demonstrate by the following formula:

$$\frac{1 \text{ sec}}{60 \text{ frames}} \times \frac{1 \text{ frame}}{1 \text{ rotation}} \times \frac{1 \text{ rotation}}{360°} \times \frac{120°}{\text{color}} = \frac{5.57 \text{ milliseconds}}{\text{color}}$$

An adapted version of this color wheel is shown in FIG. 1B. A percentage of the total time slot allocated for each color is set aside for a "white" field. This is actually a clear, or unfiltered, section of the wheel. It will be referred to here as the white field. The decision as to what percentage is to be allocated to white depends on the desires and needs of each designer and system. Too much time given to white light may bleach the colors out and render the projection unacceptable. Too little white light used may not provide sufficient gain in perceived performance to justify the complication of adding a white light capability. In FIG. 1B, $3\frac{1}{3}\%$ of the total color wheel area has been taken from each color, leaving 30% each for red 10, green 12, and blue 14. Therefore, 10% has been allocated to white 16. Using the same formula as above, with 108° for each color, and 36° for white, leads to 5.01 milliseconds for each color, and 1.67 milliseconds for white. This could increase the brightness as much as 25%. But each color saturation would be 10% less than before.

A third possibility would be to divide the wheel into four equal parts, 90° for each. This would result in a 50% brightness increase, but approximately 25% decrease in each color saturation. Each color would then receive 25% of a frame time, or 4.18 milliseconds.

Typically, the color wheel is synchronized to one junction between the fields at the beginning of every frame. In the case of the four-color wheel, the best results will most likely be achieved by synchronizing the wheel so white is the first color. This offers the possibility to raise each pixel up to a minimum brightness and then add color. For projection systems that are to be viewed directly by the eye, such as televisions, or movie projectors, it is possible that the order of presentation of the white light and the primary additive colors will be adjusted to achieve the most pleasing psychophysical presentation. For other types of projections systems, such as in printing or film processing, the order of presentation will be optimized for the media being exposed, with white appearing first in most cases to better utilize the dynamic range of the media.

For some systems, in which the light modulator has a small physical extent, it may be an advantage to spatially filter the colors. In systems with a small modulation area, increasing the modulation area increases the system efficiency. Spatial filtering is done by separating the color filters by device, or in the case of some spatial light modulators, by array area. One example of such an arrangement is shown in FIG. 2A, which shows a modulator consisting of three rows of cells. One example of such a modulator is the deformable mirror device. The column of cell 20 on modulator 18 might be filtered to only receive red light. Columns for cells 22 and 24 may be filtered for green and blue light respectively. Cells 22, 24, and 20 would, in this case, illuminate the same spot on the projection surface.

The light is split by color by filters before or after the light impinges upon the modulation surface. This can be done in many ways, including making the window on the casing of the modulator red, green and blue, or using a grid of filters before the light reaches the modulator, or after the light is reflected off of the modulator.

Again, the problem of each row or device receiving only ⅓ the intensity of the white light arises. One solution for spatial filtering is shown in FIG. 2B. In this embodiment, a fourth row has been added. This one would not be filtered. If the filters were in the casing of the modulator, this section of the glass would be clear. Now, cells 20, 22, 24 and 26 illuminate the same spot on the projection surface. The unfiltered pixel 26 would be used to up the overall intensity for the spot, and then color added with pixels 20, 22, and 24.

As with the temporal filtering discussed above, the video processor must determine a minimum brightness to be reached before the addition of color. The control functions are the same for the white light, whether done spatially or temporally. This is also true if the spatial filtering is done with a separate modulator device completely, as shown in FIG. 3A.

In FIG. 3A, there is a piece of glass 28, which has dichroic beam splitter filters built into it. Light beam 30 enter the glass piece 28. The light impinges upon red filter 32, which reflects the red light to modulator 18A. The blue and green components of the light remain unfiltered. The light then impinges upon filter 34, which separates the blue component and reflects it to modulator 18B. Surface 36 does not necessarily need to be a green filter, but for standardization of the three beams should reflect the green light to the modulator 18C. If the final light beam is not reflected, it would be the only one not reversed out of the three, and may require a modulator different from the first two.

This can be adapted relatively easily. The piece of glass 28 can be elongated, as shown in FIG. 3B. Light beam 30 is received. In this case, only a percentage of the red light is filtered out. For example, we will assume the 10% of the red light remains in path 30. Only red light will be received at modulator 18A, but some red light will remain with the blue and green components. This is repeated for blue at filter 34, leaving 10% in path 30. Filter 38 is inserted between the reflective surface 36, and filter 34. Filter 38 reflects 90% of the green light to modulator 18C, leaving 10% in path 30. The portion of beam 30 that remains after passing through the filter 38 is white light that is 10% of the original beam's intensity. This is reflected to modulator 18D.

Again, a control function is needed to determine when modulator 18D is on and when it has reflected enough white light to raise the minimum intensity to the required level. Each device in the system projects onto the same projection surfaces, with the pixels overlying each other to create the necessary colors for each part of the image. As mentioned previously, there are other ways to filter spatially with separate devices for each color, and this particular embodiment is only means as an example.

There is an inherent trade-off in this method of increasing brightness. The percentage of color saturation will be reduced to increase the brightness of the image. It is up to the designer to determine at what point he or she has received the maximum brightness possible, without detrimental decrease in color saturation. This method offers a flexible solution that can be achieved within the limitations of current light sources, while eliminating a redesign that may be necessary to use a brighter source.

Thus, although there has been described to this point particular embodiments for a method to enhance color projection with white light, it is not intended that such specific references be considered as limitations upon the scope of this invention except in-so-far as set forth in the following claims.

What is claimed is:

1. A method for spatial color filtered projection to increase brightness comprising:
   a. dividing an area to be illuminated by white light into four regions;
   b. allocating said four regions such that each region is dedicated to light with the wavelength of one of three primary additive colors, as well as white light;
   c. illuminating said regions;
   d. directing said light formed in an image onto a projection surface, such that said light from each of said regions is of the wavelength of its dedicated color when it impinges upon said surface; and
   e. selectively blending said light directed from said region allocated to white light with light directed from others of said regions to raise the overall brightness of said image on said surface.

2. The method of claim 1 wherein said area is a color wheel.

3. The method of claim 1 wherein said projection surface is a viewing screen

4. The method of claim 1 wherein said projection surface is a photosensitive media.

5. A method for temporal color filtered projection to increase brightness comprising:
   a. dividing a period of time for which a video frame is to be displayed into four segments;
   b. illuminating a spatial light modulator for said period;
   c. dedicating one filter for each of three primary additive colors as well as white light to one of said four segments; and
   d. directing light upon a projection surface from said spatial light modulator wherein said projection surface only receives light of one wavelength during any one of said four segments.

6. The method of claim 5 wherein said four segments reside upon a color wheel.

7. The method of claim 5 wherein said projection surface is a viewing screen.

8. The method of claim 5 wherein said projection surface is a photosensitive media.

9. The method of claim 5 wherein said spatial light modulator is a deformable mirror device.